US008534846B2

(12) United States Patent
Huang et al.

(10) Patent No.: US 8,534,846 B2
(45) Date of Patent: Sep. 17, 2013

(54) PROJECTION APPARATUS AND METHOD FOR ADJUSTING A DRIVING VOLTAGE OF THE PROJECTION APPARATUS

(75) Inventors: Yao-Hsien Huang, Taoyuan Hsien (TW); Chao-Shun Yang, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 515 days.

(21) Appl. No.: 12/787,896

(22) Filed: May 26, 2010

(65) Prior Publication Data

US 2011/0007282 A1     Jan. 13, 2011

(30) Foreign Application Priority Data

Jul. 9, 2009  (TW) ................................ 98123211 A

(51) Int. Cl.
*G03B 21/18* (2006.01)
*G03B 21/26* (2006.01)
*H05B 41/16* (2006.01)
*H05B 41/24* (2006.01)

(52) U.S. Cl.
USPC ................ 353/85; 353/57; 315/247; 315/576

(58) Field of Classification Search
USPC ................ 353/52, 85–86, 57; 315/247, 276; 345/211–212
See application file for complete search history.

(56) References Cited

U.S. PATENT DOCUMENTS

| 6,154,473 | A  | * | 11/2000 | Watanabe | 372/38.02 |
| 6,750,620 | B2 | * | 6/2004  | Suzuki   | 315/291   |
| 7,088,058 | B2 | * | 8/2006  | Shiota et al. | 315/291 |
| 7,273,286 | B2 | * | 9/2007  | Ikebe et al. | 353/85 |
| 7,419,270 | B2 | * | 9/2008  | Kawai | 353/85 |
| 7,438,420 | B2 | * | 10/2008 | Harada et al. | 353/30 |
| 7,453,248 | B2 | * | 11/2008 | Takeuchi | 323/285 |
| 2005/0128778 | A1 | * | 6/2005 | Chen | 363/123 |
| 2007/0222952 | A1 | | 9/2007 | Shiotsu | |
| 2008/0192210 | A1 | * | 8/2008 | Ushiyama | 353/85 |

FOREIGN PATENT DOCUMENTS

| CN | 101042519 A | | 9/2007 |
| CN | 201178517 Y | | 1/2009 |
| JP | 2006154002 A | * | 6/2006 |
| KR | 2009064496 A | * | 6/2009 |

OTHER PUBLICATIONS

Taiwan Office Action dated Mar. 25, 2013 for Taiwan Patent Application No. 10220355140.

* cited by examiner

*Primary Examiner* — Tony Ko
*Assistant Examiner* — Jori S Reilly-Diakun
(74) *Attorney, Agent, or Firm* — Patterson Thuente Pedersen, P.A.

(57) ABSTRACT

A projection apparatus and a method for adjusting a driving voltage of the projection apparatus are provided. The projection apparatus comprises an illuminant module, an output voltage control module, an illuminant driver module, and an illuminant driver management module. The output voltage control module is configured to output a driving voltage. The illuminant driver module is configured to output an illuminant voltage to the illuminant module after receiving the driving voltage. The illuminant driver management module is configured to receive the illuminant voltage and to detect a variation in the illuminant voltage. Then, the illuminant driver management module outputs a control signal to the output voltage control module according to the variation of the illuminant voltage. Finally, the output voltage control module adjusts the driving voltage according to the control signal.

7 Claims, 4 Drawing Sheets

PROJECTION APPARATUS AND METHOD FOR ADJUSTING A DRIVING VOLTAGE OF THE PROJECTION APPARATUS

This application claims the benefit of priority based on Taiwan Patent Application No 098123211, filed on Jul. 9, 2009, the contents of which are incorporated herein by reference in their entirety.

CROSS-REFERENCES TO RELATED APPLICATIONS

Not applicable.

BACKGROUND OF THE INVENTION

1. Field of the Invention

The present invention relates to a projection apparatus. More particularly, the present invention relates to a projection apparatus that can control a temperature by adjusting a driving voltage and reducing a volume of a heat dissipation system thereof.

2. Descriptions of the Related Art

Because of the gradual improvement of image quality, decrease in the production cost and miniaturization of projection apparatuses over recent years, the usage of projection apparatuses has increased gradually. For example, enterprise users usually present using projection apparatuses, while average individuals/homes have used projection apparatuses in home theaters. A common projection apparatus available in the market comprises at least an illuminant module and an imaging module, wherein the illuminant module is configured to provide a uniform and concentrated light beam to the imaging module. The imaging module is configured to perform the post-end image output by the foresaid concentrated light beam. For the illuminant module, a high-power bulb is usually used as a primary component to provide a source of light beams; unfortunately, such a bulb also acts as the primary heat source in the projection apparatus, which is especially the case for digital light processing (DLP) projection apparatuses.

After the projection apparatus has operated for a period of time, the intense heat generated by the illuminant module causes a substantial reduction in the operating efficiency of the projection apparatus, or even in the failure of the projection apparatus. Such a problem caused by the intense heat bothers not only a lot of users but also the manufacturers of the projection apparatuses. Therefore, to decrease the operating temperature of the illuminant modules, heat dissipation designs, such as cooling fans or heat pipes, usually have to be adopted for the illuminant modules by the manufacturers to prevent damage to the illuminant modules.

In addition, each projection apparatus has a power supply module, which is configured to supply a driving voltage to the illuminant module and operates within an operating voltage range. When an input voltage received by the power supply module falls outside the operating voltage range, the driving voltage will cause power dissipation and the substantial rise in temperature of the illuminant module, and consequently, the temperature of the projection apparatus will rise accordingly. To solve this problem, the manufacturers of the projection apparatuses usually enlarge the operating voltage range of the projection apparatus to prevent the power dissipation and the temperature rise of illuminant sources caused by the variation of the input voltage and the consequent damage of the projection apparatus. However, the enlargement of the operating voltage range causes a significant increase in the volume of the power supply module and adds to the difficulty in the adjustment of the driving voltage.

In view of this, it is important to provide a projection apparatus that has a compact volume and superior heat dissipation capability to decrease unnecessary power dissipation and maintain a stable operation of the projection apparatus for a prolonged service life.

SUMMARY OF THE INVENTION

An objective of the present invention is to provide a projection apparatus, which comprises an illuminant module, an output voltage control module, an illuminant driver module and an illuminant driver management module. The output voltage control module is configured to output a driving voltage. The illuminant driver module, which is electrically connected to the output voltage control module and the illuminant module, is configured to receive the driving voltage and output an illuminant voltage to the illuminant module according to the driving voltage. The illuminant driver management module, which is electrically connected to the output voltage control module, is configured to receive the illuminant voltage, detect a variation of the illuminant voltage, and output a first control signal to the output voltage control module according to the variation of the illuminant voltage such that the output voltage control module adjusts the driving voltage according to the first control signal.

Another objective of the present invention is to provide a method for adjusting a driving voltage of the projection apparatus described above. The method comprises the following steps: (a) outputting an illuminant voltage to the illuminant module according to the driving voltage; (b) detecting a variation of the illuminant voltage; (c) outputting a first control signal according to the variation of the illuminant voltage; and (d) adjusting the driving voltage according to the first control signal.

According to the above description, by using the illuminant driver management module to adjust the driving voltage, the projection apparatus and method for adjusting the driving voltage of the projection apparatus according to the present invention can control the power dissipation and temperature of the illuminant driver module and the illuminant module of the projection apparatus while still reducing the volume thereof. As a result, the projection apparatus can be made compact, and unnecessary power dissipation is decreased to prolong the service life of the projection apparatus.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, this invention will be explained with reference to embodiments thereof. However, the description of these embodiments is only for purposes of illustration rather than limitation. It should be appreciated that in the following embodiments and attached drawings, elements unrelated to this invention are omitted from depictions; and dimensional relationships among individual elements in the attached drawings are illustrated only for ease of understanding, but not to limit the actual scale.

Figure 1:
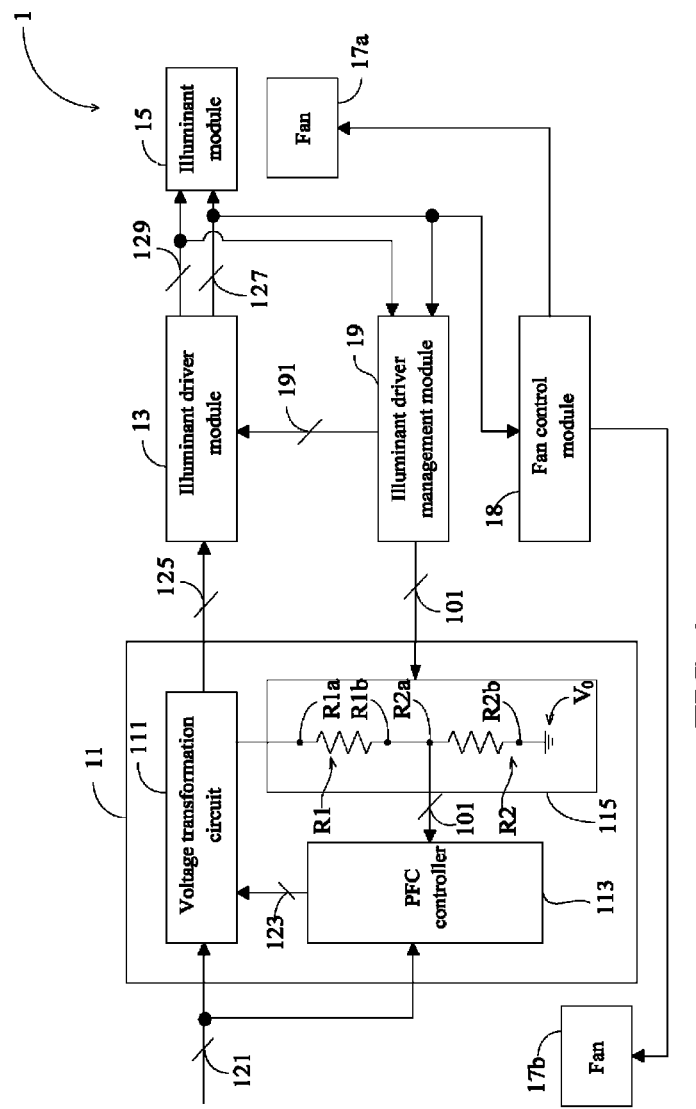
FIG. 1 is a schematic view of a first embodiment of the present invention.

FIG. 1 illustrates the first embodiment of the present invention which is a projection apparatus 1, and it comprises an output voltage control module 11, an illuminant driver module 13, an illuminant module 15 and an illuminant driver management module 19. The illuminant driver module 13 is electrically connected to the output voltage control module 11 and the illuminant module 15. The illuminant driver management module 19 is electrically connected to the output voltage control module 11 and the illuminant driver module 13.

When the projection apparatus 1 is powered on and operated, the output voltage control module 11 receives an input voltage 121 and outputs a driving voltage 125 to the illuminant driver module 13 according to the input voltage 121. The input voltage 121 is an alternating current (AC) power source, a voltage value of which tends to vary with the place or time at which the power source is used in practical application. After receiving the driving voltage 125, the illuminant driver module 13 outputs an illuminant voltage 127 and an illuminant current 129 to the illuminant module 15. Then, in response to the illuminant voltage 127 and the illuminant current 129, light is projected by a high-power bulb of the illuminant module 15. Generally speaking, the high-power bulb of the illuminant module 15 is usually a high intensity discharge (HID) light tube. Thereby, the illuminant module 15 can provide a uniform and concentrated light beam to an imaging module of the projection apparatus 1 so that the imaging module outputs an image from its back-end by the aforesaid light beam.

More specifically, the output voltage control module 11 further comprises a voltage transformation circuit 111, a power factor correction (PFC) controller 113 and a PFC voltage dividing feedback circuit 115. The PFC controller 113 is electrically connected to the voltage transformation circuit 111. The PFC voltage dividing feedback circuit 115 is also electrically connected to the voltage transformation circuit 111. The PFC voltage dividing feedback circuit 115 further comprises a first resistor R1 and a second resistor R2. The first resistor R1 has a first end R1$a$ and a second end R1$b$, while the second resistor R2 also has a first end R2$a$ and a second end R2$b$. The first end R1$a$ of the first resistor R1 is electrically connected to the voltage transformation circuit 111; the second end R1$b$ of the first resistor R1 is electrically connected to the first end R2$a$ of the second resistor R2; and the second end R2$b$ of the second resistor R2 is electrically connected to a reference potential V0. It should be noted that because the second end R1$b$ of the first resistor R1 and the first end R2$a$ of the second resistor R2 are electrically connected to present the same potential, the PFC controller 113 may be electrically connected to either the second end R1$b$ of the first resistor R1 or the first end R2$a$ of the second resistor R2.

The illuminant driver management module 19 is electrically connected to the PFC voltage dividing feedback circuit 115 of the output voltage control module 11. When the projection apparatus 1 is operating, the illuminant driver management module 19 receives both the illuminant voltage 127 and the illuminant current 129, detects variations of the illuminant voltage 127 and the illuminant current 129, and outputs a first control signal 101 to the PFC voltage dividing feedback circuit 115 according to the variations of the illuminant voltage 127 and the illuminant current 129.

Figure 2:
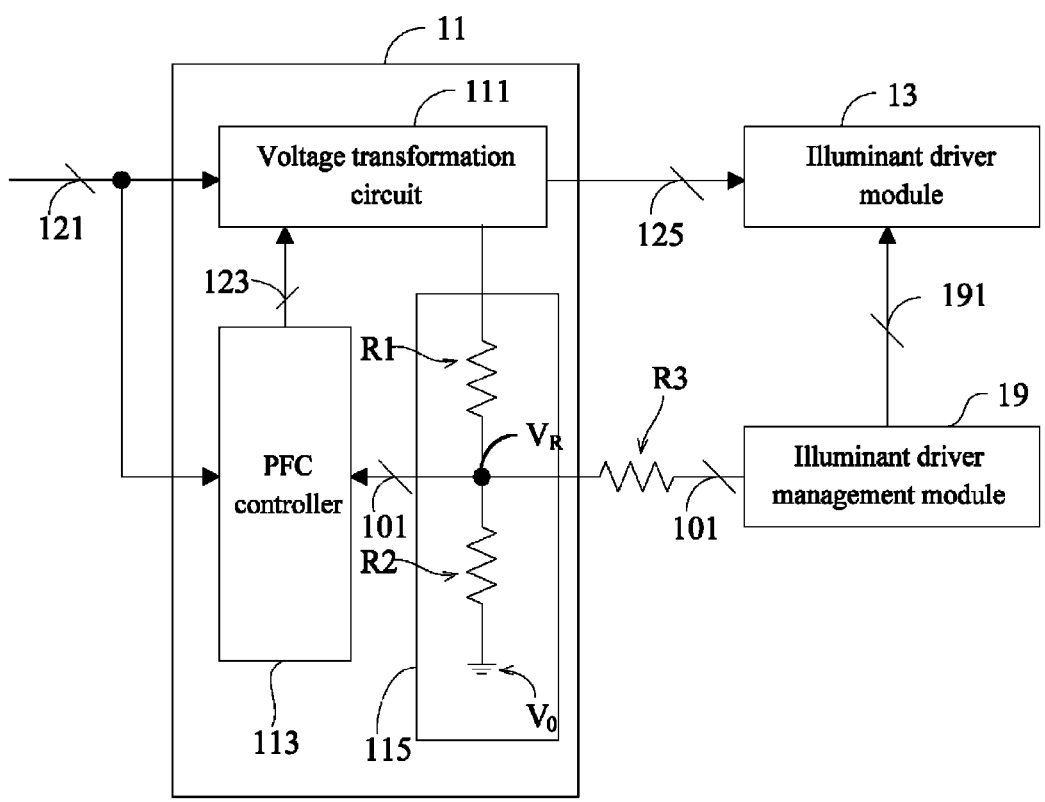
FIG. 2 is another schematic view of the first embodiment of the present invention.

Furthermore, when a decrease in the illuminant voltage 127 is detected by the illuminant driver management module 19, the illuminant driver management module 19 will output the first control signal 101 to the output voltage control module 11 accordingly. It should be particularly noted that when the illuminant driver management module 19 outputs the first control signal 101 to the PFC voltage dividing feedback circuit 115 of the output voltage control module 11, the first control signal 101 will be guided to the PFC voltage dividing feedback circuit 115 via a third resistor R3 as shown in FIG. 2 and then further transmitted to the PFC controller 113 from the PFC voltage dividing feedback circuit 115. However, the present invention has no limitation on how the first control signal 101 is outputted to the PFC voltage dividing feedback circuit 115, and those skilled in the art may have the first control signal 101 guided to the PFC voltage dividing feedback circuit 115 in different ways depending on the practical needs; thus, this will not be further described herein.

After the first control signal 101 is received by the PFC voltage dividing feedback circuit 115 of the output voltage control module 11, the first control signal 101 is transmitted by the PFC voltage dividing feedback circuit 115 to the PFC controller 113 via the second end R1$b$ of the first resistor R1 or the first end R2$a$ of the second resistor R2. In response to the first control signal 101, the PFC controller 113 will adjust the ratio of resistance values between the first resistor R1 and the second resistor R2 of the PFC voltage dividing feedback circuit 115 to output a second control signal 123 to the voltage transformation circuit 111. Finally, the driving voltage 125 is adjusted by the voltage transformation circuit 111 according to the aforesaid ratio of resistance values and the second control signal 123. For example, when the illuminant voltage 127 decreases, the voltage transformation circuit 111 decreases the driving voltage 125 according to the ratio of resistance values and the second control signal 123. As a result, the efficiency of the illuminant driver module 13 is relatively improved.

Meanwhile, to prevent a high temperature caused by an increased illuminant current from the illuminant driver module 13 when the illuminant voltage 127 decreases, the projection apparatus 1 of this embodiment further comprises two fans 17$a$, 17$b$ and a fan control module 18. More specifically, when a decrease in the illuminant voltage 127 is detected by the fan control module 18, the fans 17$a$, 17$b$ will be adjusted to a higher rotational speed for enhanced heat dissipation capability. On the contrary, when an increase in the illuminant voltage 127 is detected by the fan control module 18, the fans 17$a$, 17$b$ will be adjusted to a lower rotational speed to decrease the power dissipation of the projection apparatus 1.

The illuminant driver management module 19 further detects a temperature variation of the projection apparatus 1 by means of a sensor (not shown), and outputs a current control signal 191 to the illuminant driver module 13 according to the temperature variation of the projection apparatus 1 at the same time. After receiving the current control signal 191, the illuminant driver module 13 will adjust the illuminant current 129 according to the current control signal 191. As a result, according to the variations of the illuminant voltage 127 and the illuminant current 129, the electric power and temperature of the illuminant module 15 can be adjusted respectively by the illuminant driver management module 19 to maintain the luminance of the illuminant module 15 in an optimal range while still reducing the power dissipation and temperature of the projection apparatus 1.

On the other hand, the PFC controller 113 is further configured to detect a variation of the first control signal 101 and according to the variation of the first control signal 101, adjust the ratio of the resistance values between the first resistor R1 and the second resistor R2 to output a second control signal 123 to the voltage transformation circuit 111 so that the magnitude of the driving voltage 125 is adjusted by the voltage transformation circuit 111 according to the ratio of resistance values and the second control signal 123. In the summary of the above descriptions, the illuminant driver management module 19 of the projection apparatus 1 outputs the first control signal 101 according to a variation of the illuminant voltage 127, while the output voltage control module 11 adjusts the ratio of resistance values of the PFC voltage dividing feedback circuit 115 according to the variation of the first control signal 101 to output the second control signal 123. Furthermore, the PFC controller 113 also receives the input voltage 121 to maintain the operation thereof. Thereby, the driving voltage 125 outputted by the voltage transformation circuit 111 can be adjusted according to the first control signal 101 and the illuminant voltage 127 to control the power dissipation and temperature of the projection apparatus 1. Meanwhile, the volume of the projection apparatus 1 can also be reduced by maintaining the operating voltage range thereof. As a result, the projection apparatus can be made compact, and unnecessary power dissipation is decreased to prolong the service life of the projection apparatus.

It should be particularly noted that the magnitude of the driving voltage 125 is controlled by both the input voltage 121 and the first control signal 101 at different times. Specifically speaking, when the projection apparatus 1 is being powered on, the input voltage 121 will be received via the output voltage control module 11 and generate the driving voltage 125. However, after the projection apparatus 1 has been powered on, the magnitude of the driving voltage 125 is adjusted by the PFC controller 113 according to the first control signal 101. Meanwhile, the PFC controller 113 still receives the input voltage 121 to maintain the operation thereof without affecting the magnitude of the driving voltage 125.

Figure 3:
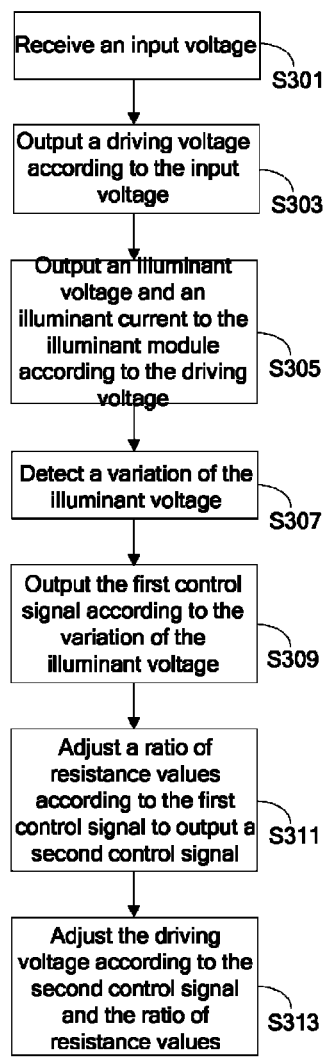
FIGS. 3-5 illustrate flowcharts of a second embodiment of the present invention.
Figure 4:
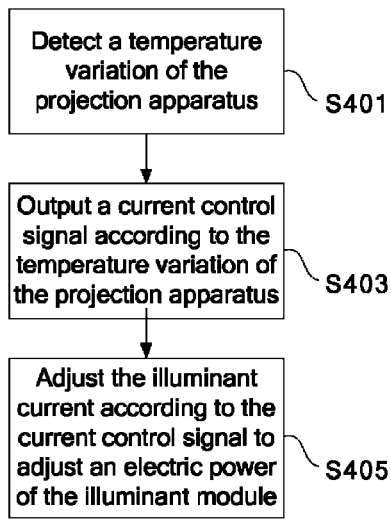
Figure 5:
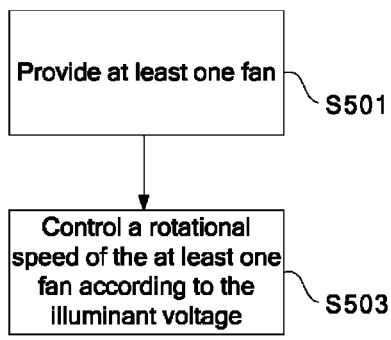

FIGS. 3, 4 and 5 illustrate the second embodiment of the present invention and the method for adjusting the driving voltage of the projection apparatus described above, which comprises the following steps. Initially in step S301, an input voltage is received by the output voltage control module. Then, in step S303, a driving voltage is outputted by the voltage transformation circuit of the output voltage control module to the illuminant driver module according to the input voltage. In step S305, an illuminant voltage and an illuminant current are outputted to the illuminant module by the illuminant driver module according to the driving voltage. In step S307, a variation of the illuminant voltage is detected by the illuminant driver management module. Subsequently, in step S309, the first control signal is outputted by the illuminant driver management module according to the variation of the illuminant voltage. In step S311, the first control signal is received by the output voltage control module, and a ratio of resistance values is adjusted by the output voltage control module according to the first control signal to output a second control signal. Finally in step S313, the driving voltage is adjusted by the voltage transformation circuit of the output voltage control module according to the second control signal and the ratio of resistance values.

More specifically, if a decrease in the illuminant voltage is detected by the illuminant driver management module in step S307, then the output voltage control module will adjust the ratio of resistance values according to the first control signal and generate a second control voltage so that the voltage transformation circuit of the output voltage control module decreases the driving voltage according to the second control signal and the ratio of resistance values.

Meanwhile, as shown in FIG. 4, the method for adjusting the driving voltage of the projection apparatus described in the second embodiment is also capable of adjusting an electric power of the illuminant module. Initially in step S401, the temperature variation of the projection apparatus is detected by the illuminant driver management module. Then, in step S403, a current control signal is outputted by the illuminant driver management module to the illuminant driver module according to the temperature variation of the projection apparatus. Finally, in step S405, the illuminant current is adjusted by the illuminant driver module according to the current control signal to adjust an electric power of the illuminant module.

It should further be noted that as shown in FIG. 5, the method for adjusting the driving voltage of the projection apparatus described in the second embodiment is also capable of controlling the rotational speed of the fans according to the illuminant voltage. Initially, in step S501, at least one fan (e.g., the fans 17a, 17b of the projection apparatus 1 in the first embodiment) is provided. Finally, in step S503, the rotational speed of the at least one fan is controlled according to the illuminant voltage. Thereby, when the illuminant voltage outputted by the illuminant driver module varies, the rotational speed of the fan(s) of the projection apparatus can be further adjusted according to the variation of the illuminant voltage to prevent unnecessary power dissipation.

In summary of the above descriptions, by using the illuminant driver management module, the PFC controller and the PFC voltage dividing feedback circuit, the driving voltage outputted by the voltage transformation circuit can be adjusted to control the power dissipation and temperature of the projection apparatus. As compared to the prior art, the present invention can prevent the illuminant driver module and the illuminant module from causing a high temperature, which may improve the operating efficiency and reduce the volume of the projection apparatus while maintaining the electric power of the illuminant module at a certain level. Thereby, an optimal light emitting efficiency is achieved and unnecessary power dissipation is decreased to prolong the service life of the projection apparatus.

The above embodiments merely give the detailed technical contents of the present invention and inventive features thereof, and are not to limit the covered range of the present invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection apparatus, comprising:
   an illuminant module;
   an output voltage control module, comprising a voltage transformation circuit, and being configured to output a driving voltage;
   an illuminant driver module, electrically connected to the output voltage control module and the illuminant module, being configured to receive the driving voltage, and to output an illuminant voltage to the illuminant module according to the driving voltage;
   an illuminant driver management module, electrically connected to the output voltage control module, being configured to receive the illuminant voltage, to detect a variation of the illuminant voltage, and to output a first control signal to the output voltage control module according to the variation of the illuminant voltage, such that the output voltage control module adjusts the driving voltage according to the first control signal; and a power factor correction (PFC) voltage dividing feedback circuit, electrically connected to the illuminant driver management module and the voltage transformation circuit, being configured to receive and transmit the first control signal;

wherein the PFC voltage dividing feedback circuit adjusts the driving voltage outputted from the voltage transformation circuit according to the first control signal, and the voltage transformation circuit is electrically connected to the illuminant driver module and configured to receive the input voltage and to output the driving voltage to the illuminant driver module, according to the input voltage.

2. The projection apparatus as claimed in claim 1, wherein the output voltage control module reduces the driving voltage according to the first control signal when the variation of the illuminant voltage reduces.

3. The projection apparatus as claimed in claim 1, wherein the output voltage control module further comprises:
 a PFC controller, electrically connected to the PFC voltage dividing feedback circuit and the voltage transformation circuit, being configured to receive the first control signal from the PFC voltage dividing feedback circuit;
 wherein the PFC controller is configured to detect a variation of the first control signal and to output a second control signal to the voltage transformation circuit according to the variation of the first control signal.

4. The projection apparatus as claimed in claim 3, wherein the PFC voltage dividing feedback circuit further comprises:
 a first resistor having a first end and a second end, wherein the first end of the first resistor is electrically connected to the voltage transformation circuit; and
 a second resistor having a first end and a second end, wherein the first end of the second resistor is electrically connected to the second end of the first resistor, and the second end of the second resistor is electrically connected to a reference potential end;
 wherein a ratio of resistance value is existed between the first resistor and the second resistor, and the voltage transformation circuit adjusts the driving voltage according to the second control signal and the ratio of resistance value.

5. The projection apparatus as claimed in claim 4, wherein the PFC controller is electrically connected to the second end of the first resistor and is configured to receive the first control signal.

6. The projection apparatus as claimed in claim 1, further comprising:
 at least one fan; and
 a fan control module, electrically connected to the at least one fan, being configured to receive the illuminant voltage, and to control a rotational speed of the at least one fan according to the illuminant voltage.

7. The projection apparatus as claimed in claim 1, wherein the illuminant driver management module is electrically connected to the illuminant driver module, the illuminant driver module further outputs an illuminant current to the illuminant module, the illuminant driver management module further detects a temperature variation of the projection apparatus and outputs a current control signal to the illuminant driver module according to the temperature variation of the projection apparatus, such that the illuminant driver module adjusts the illuminant current according to the current control signal to adjust an electric power of the illuminant module.

* * * * *